(12) United States Patent
Crosby

(10) Patent No.: US 10,802,937 B2
(45) Date of Patent: Oct. 13, 2020

(54) HIGH ORDER LAYER INTRUSION DETECTION USING NEURAL NETWORKS

(71) Applicant: Ralph W. Crosby, Charleston, SC (US)

(72) Inventor: Ralph W. Crosby, Charleston, SC (US)

(73) Assignee: United States of America as Represented by the Secretary of the Navy, Washington, DC (US)

(*) Notice: Subject to any disclaimer, the term of this patent is extended or adjusted under 35 U.S.C. 154(b) by 0 days.

(21) Appl. No.: 16/275,139

(22) Filed: Feb. 13, 2019

(65) Prior Publication Data
US 2020/0257602 A1 Aug. 13, 2020

(51) Int. Cl.
| | | |
|---|---|---|
| H04L 29/08 | (2006.01) | |
| G06F 11/30 | (2006.01) | |
| G06F 21/55 | (2013.01) | |
| G06K 9/62 | (2006.01) | |
| G06N 20/00 | (2019.01) | |
| G06N 3/04 | (2006.01) | |
| H04L 29/06 | (2006.01) | |

(52) U.S. Cl.
CPC ........ *G06F 11/3006* (2013.01); *G06F 21/552* (2013.01); *G06K 9/6267* (2013.01); *G06N 3/04* (2013.01); *G06N 20/00* (2019.01); *H04L 69/16* (2013.01); *H04L 69/326* (2013.01); *H04L 69/327* (2013.01)

(58) Field of Classification Search
None
See application file for complete search history.

(56) References Cited

U.S. PATENT DOCUMENTS

| | | | | |
|---|---|---|---|---|
| 9,621,431 B1* | 4/2017 | Cardente | .................. | H04L 41/12 |
| 10,354,205 B1* | 7/2019 | Pham | ..................... | G06N 20/00 |
| 2014/0297572 A1* | 10/2014 | Zambon | .................. | H04L 43/18 |
| | | | | 706/12 |
| 2015/0052090 A1* | 2/2015 | Lin | ........................ | G06N 7/005 |
| | | | | 706/12 |
| 2018/0367553 A1* | 12/2018 | Hayden | ............... | H04L 63/1425 |
| 2019/0245734 A1* | 8/2019 | Wu | ......................... | H04L 41/16 |
| 2020/0011932 A1* | 1/2020 | Hooshmand | .......... | G01R 31/367 |

OTHER PUBLICATIONS

U.S. Appl. No. 62/694,129 Provisional Patent Application, (Hooshmand Ali et al., Battery Capacity Fading Model Using Deep Learning Methods) Jul. 5, 2018 [retrieved on Jun. 23, 2020].

* cited by examiner

*Primary Examiner* — Viet D Vu
(74) *Attorney, Agent, or Firm* — Naval Information Warfare Center, Pacific; Kyle Eppele; James McGee

(57) ABSTRACT

Methods and systems for network intrusion detection at higher order OSI layers of the network using machine learning can include the initial step of reformatting data packets that are being transmitted between two access points on the monitored network from an OSI lower level TCP/IP data packets format into an OSI Session layer or above format at a reformatting module, to yield a conversation dataset of high order conversations. The methods and systems can also include the steps of training a machine learning module using the OSI Session layer-formatted conversation dataset, and classifying the network activity as either normal or abnormal network activity using the trained machine learning module. For some embodiments and systems, the step of inspecting the TCP/IP data packet content with a rules-based module and using rules-based criteria, can be included for additional security.

14 Claims, 6 Drawing Sheets

OSI Model

| | Layer | Protocol data unit (PDU) | Function |
|---|---|---|---|
| 18 — Application | | High-level APIs, including resource sharing, remote file access |
| 17 — Presentation | Data | Translation of data between a networking service and an application; including character encoding, data compression and encryption/decryption |
| Host layers | 16 — Session | | Managing communication sessions, i.e. continuous exchange of information in the form of multiple back-and-fourth transmissions between two nodes |
| 15 — Transport | Segment (TCP) / Datagram (UDP) | Reliable transmission of data segments between points on a network, including segmentation, acknowledgement and multiplexing |
| 14 — Network | Packet | Structuring and managing a multi-node network, including addressing, routing and traffic control |
| Media layers | 13 — Data link | Frame | Reliable transmission of data frames between two nodes connected by a physical layer |
| 12 — Physical | Bit | Transmission and reception of raw bit streams over a physical medium |

HIGH ORDER LAYER INTRUSION DETECTION USING NEURAL NETWORKS

FEDERALLY-SPONSORED RESEARCH AND DEVELOPMENT

The United States Government has ownership rights in this invention. Licensing inquiries may be directed to Office of Research and Technical Applications, Space and Naval Warfare Systems Center, Atlantic, Code 70E00, 1 Innovation Drive, Hanahan, S.C., 29410-4200; telephone (843) 218-3495; email: ssc_lant_T2@navy.mil, referencing 107819.

FIELD OF THE INVENTION

The present invention pertains generally to systems and methods for establishing and monitoring a secure network. More specifically, the invention pertains to systems and methods for network security that monitor conversations between two access points on the network. The invention is particularly, but not exclusively, useful as machine learning systems and methods for network security that use higher order protocol time relationships between data packets in conversations between the access points, as opposed to the contents of the data packets, in order to learn and distinguish between normal and intrusive network behaviors.

BACKGROUND OF THE INVENTION

In today's world, the need for network integrity and security is well established. Network security can need to occur at a variety of levels, and can typically be accomplished by low-level data packet filtering for the detection of unusual network activity.

With respect to characterization of the network layers, or levels (in the Specification, the terms "layer" and "level" are used interchangeably and can be taken to mean the same thing), the Open Systems Interconnection (OSI) model can be known in the prior art as a conceptual network architecture model. The OSI model can characterize and can standardize the communication levels of a telecommunication or computing network, without regard to the network underlying internal structure and technology. The goal of the OSI model can be the interoperability of diverse communication systems with standard protocols. The OSI model can partition a communication system into abstraction layers. The original version of the OSI model defined seven layers; layer 1 (Physical layer), layer 2 (Data link layer), layer 3 (Network layer), layer 4 (Transport layer), layer 5 (Session layer), layer 6 (Presentation layer) and layer 7 (Application layer). Layer 3, also known as the Packet layer, can be where the Internet Protocol (IP) falls in the OSI model. Transmission Control Protocol (TCP) can take place one layer up at layer 4, the Transport layer.

Most intrusion detection systems can tend to focus on monitoring of the TCP (Transport)/IP (Network) and lower OSI levels. But these TCP/IP systems do not help in cases where the data traffic can appear as valid TCP/IP activity, but can represent an intrusion nonetheless. For example, consider the case of a hacker that has obtained access to a network through stolen credentials. To an intrusion monitoring system, the hacker access to the network might not appear to be anything other than valid TCP/IP traffic. In this hypothetical, however, what can be different is the hacker pattern, or cadence, of access to various webpages in the website being accessed (in the case of an internet network).

For example, a hacker might log into a tactical web site and browse around looking to see what is present and accessible. This can be in contrast to the access pattern of a "normal" user who would log in and go directly to the page(s) the user would normally require. Conventional intrusion detection systems would, assuming the hacker was careful, not detect the hacker activity.

Rules-based network intrusion systems and methods can monitor TCP/IP activity by using the actual contents of the data packets that are being transmitted using the TCP/IP protocol. But to detect the type of hacker intrusion described above, the time relationships between data packets that are being transmitted between two access points on a network must be examined. Stated differently, the network would have to be monitored at the OSI Session layer (OSI Layer 5) or above. But to do this, the intrusion system would need to "learn" what is "normal" for data transmission traffic between the access points that are being monitored. Additionally, the access point(s) could change, so the intrusion systems would have to be able to quickly adapt to the change in transmission path (change in one/both of the access points). The adaptations would have to be done quickly and automatically, as there can be a myriad and potentially infinite number of access point combinations that might need to be monitored, particularly when the network being monitored is the internet, and the access points are IP addresses.

In view of the above, it can be an object of the present invention to provide a system and method for network intrusion detection that can detect such intrusion thorough examination of network interactions between two network access points at OSI levels above OSI Transport level, where TCP occurs. Another object of the present invention can be to provide a system and method for network intrusion detection, which can detect an intrusion using network data at the OSI Session layer and/or the OSI Presentation layer. Yet another object of the present invention can be to provide a system and method of network intrusion detection, which can detect an intrusion by detection of pattern anomalies in a transmission sequence of data packets between access points, or conversations, using machine learning. Still another object of the present invention can be to provide a system and method for network intrusion detection that can detect an intrusion without accessing or analyzing the contents of the data packets that are being transmitted between two access points. Yet another object of the present invention can be counter an insider threat, where a network user that has authorized access to certain portions of a network attempts to access unauthorized portions of the network. Another object of the present invention can be to provide a system and method for detection of network intrusions, which can be easier to implement in a cost-effective manner when compared to its prior art counterparts.

SUMMARY OF THE INVENTION

Methods for network intrusion detection at higher order layers of the network using machine learning (and systems for accomplishing the methods) can include the initial step of reformatting data packets that are transmitted between two or more network access points. This can be accomplished by a reformatting module, which can reformat the data packets from an Open System Interconnection (OSI) TCP/IP format into an OSI Session layer or above format, which can yield a conversation dataset of high order conversations. The methods can also include the steps of training a machine learning module using the conversation dataset, and classifying the conversation dataset s as either normal network activity or abnormal network activity using the trained machine learning module. For some embodiments, the step of inspecting the TCP/IP data packets content with a rules-based module using rules-based criteria can be included prior to reformatting, for additional security.

The training step can include the step of splitting the conversation dataset into a training data subset, a validation data subset and a test data subset, and then oversampling the training data subset to yield a balanced training data subset. The balanced training data subset, the validation data subset and the test data subset can be normalized into a format that can be suitable for input into the machine learning module. After normalization, the balanced and normalized training data subset can be used to train the machine learning module. After normalization, the validation data subset can be used to validate the balanced training data subset, resulting in an estimated training accuracy for the machine learning module. Also after normalization, the test data subset can be used to test the balanced training data subset, to yield an estimated operational accuracy for the machine learning module. The methods can also include the step of classifying the normalized conversation data set from the higher-order layer OSI reformatting module as normal or abnormal, by receiving the conversation dataset (after having been normalized) at the trained machine learning module, and classifying the high order conversations as normal or abnormal using the machine learning module.

For several embodiments, the machine learning module can be a recurrent neural network. The recurrent neural network can have at least one layer of long short-term memory (LSTM) cells and at least one layer of cells that can use rectified linear units. The rectified linear units can have a width that can vary between 400 and 1200 cells. In still other embodiments, a rules-based module for monitoring TCP/IP network activity can be incorporated at the OSI Transport layer or below. The rules-based module can cooperate with the recurrent neural network to provide an added security posture for the network that is being monitored.

BRIEF DESCRIPTION OF THE DRAWINGS

The novel features of the present invention will be best understood from the accompanying drawings, taken in conjunction with the accompanying description, in which similarly-referenced characters refer to similarly-referenced parts, and in which:

FIG. 1 can be a table that can aid in understanding of the Open Systems Interconnection (OSI) network transmission model;

DETAILED DESCRIPTION OF THE EMBODIMENTS

Figure 2:
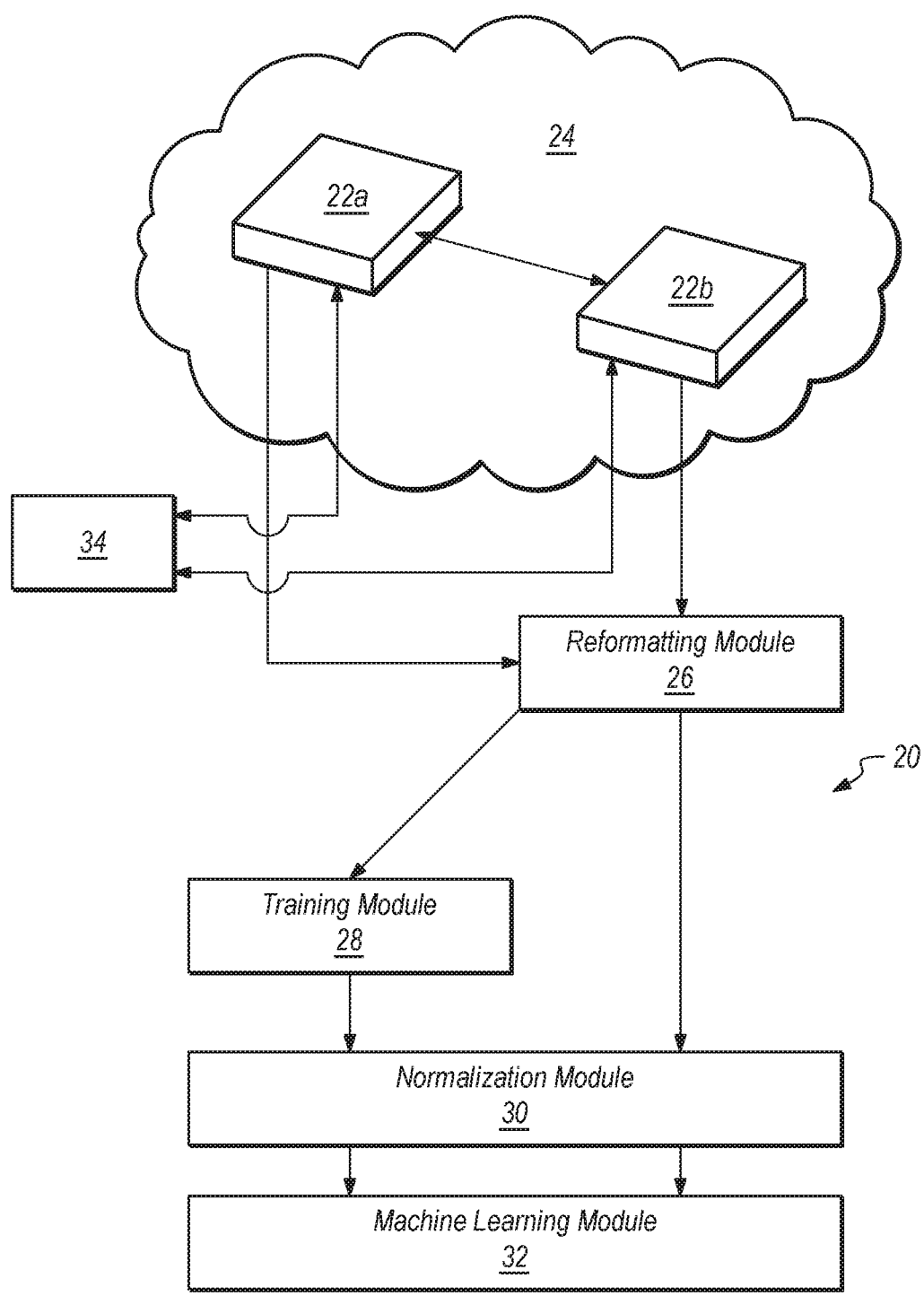
FIG. 2 can be a high level block diagram of the systems of the present invention according to several embodiments.

By way of background, the Open Systems Interconnection model (OSI model) can be thought of as a conceptual model for network communications that can characterize and can standardize the communication functions of a telecommunication or computing network without regard to its underlying internal structure and technology. Its goal can be the interoperability of diverse communication networks and systems using standard protocols. The model partitions a communication system into abstraction layers. Each layer serves the layer above it and is served by the layer below it. For example, a layer that provides error-free communications across a network provides the path needed by applications above it, while it calls the next lower layer to send and receive packets that comprise the contents of that path.

Referring initially to prior art FIG. 1, a depiction table 10 of the OSI model can be seen. In FIG. 1, layer 1, the Physical layer 12, can be responsible for the transmission and reception of unstructured raw data between a device and a physical transmission medium. As shown in FIG. 1, Physical layer 12 can have a bit Protocol Data Unit (PDU) and can be the layer where digital bits can be converted into electrical, radio, or optical signals. Layer 1 specifications can define characteristics such as voltage levels, the timing of voltage changes, physical data rates, maximum transmission distances, and physical connectors. Characteristics can further include the layout of pins, voltages, line impedance, cable specifications, signal timing and frequency for wireless devices. Bit rate control is done at the Physical layer 12 and may define transmission mode as simplex, half duplex, and full duplex. The components of a Physical layer 12 can be described in terms of a network topology. Bluetooth, Ethernet, and USB all have specifications for a Physical layer 12, or layer 1.

Layer 2, the Data Link layer 13, can provide for node-to-node data transfer—a link between two directly connected nodes. It can detect and can possibly correct errors that may occur in the Physical layer 12. As shown in FIG. 1, Physical layer 12 can have a frame PDU and can define the protocol to establish and terminate a connection between two physically connected devices. It can also define the protocol for flow control between them.

Layer 3, the Network layer 14, can provide the functional and procedural means of transferring variable length data sequences (called packets) from one node to another connected in "different networks". A network can be a medium to which many nodes can be connected, on which every node has an address and which permits nodes connected to it to transfer messages to other nodes connected to it by merely providing the content of a message and the address of the destination node and letting the network find the way to deliver the message to the destination node, possibly routing it through intermediate nodes. If the message is too large to be transmitted from one node to another on the Data Link layer 12 between those nodes, the network may implement message delivery by splitting the message into several fragments at one node, sending the fragments independently, and reassembling the fragments at another node. It may, but does not need to, report delivery errors.

As shown in FIG. 1, Network layer 14 can have a packet PDU. Message delivery at the Network layer 14 is not necessarily guaranteed to be reliable; a Network layer 14 protocol may provide reliable message delivery, but it need not do so. A number of layer-management protocols can belong to the Network layer 14. These can include routing protocols, multicast group management, network-layer information and error, and network-layer address assignment. It can be the function of the payload that can make the data packets belong to the Network layer 14, not the protocol that carries them.

Layer 4, the Transport layer 15, can provide the functional and procedural means of transferring variable-length data sequences from a source to a destination host, while maintaining the quality of service functions. As shown in FIG. 1, the Transport layer 15 can have a segment (TCP) or datagram (UDP) PDU, and can control the reliability of a given link through flow control, segmentation and/or desegmentation, and error control. The Transport layer 15 can also provide the acknowledgement of the successful data transmission and can send the data if no errors occurred. The Transport layer 15 can create segments out of the message received from the application layer. Segmentation is the process of dividing a long message into smaller messages.

An easy way to visualize the Traansport layer 15 can be to compare it with a post office, which deals with the dispatch and classification of mail and parcels sent (analogous to data packets being sent). A post office inspects only the outer envelope of mail to determine its delivery. Higher OSI layers may have the equivalent of double envelopes, such as cryptographic presentation services that can be read by the addressee only.

Referring still to FIG. 1, Layer 5, or the Session layer 15, can control the dialogues (connections) between computers. It can establish, manage and terminate the connections between local and remote applications. It can provide for full-duplex, half-duplex, or simplex operation, and can establish procedures for check pointing, suspending, restarting, and terminating a session. In the OSI model, this layer can be responsible for gracefully closing a session, which can further be handled in the Transmission Control Protocol at the Transport layer 15 in the Internet Protocol Suite. This layer can be also responsible for session checkpointing and recovery, which is not usually used in the Internet Protocol Suite. The Session layer 15 is commonly implemented explicitly in application environments that use remote procedure calls.

Layer 6, or the Presentation layer 17, can establish context between application-layer entities, in which the Application layer 18 entities may use different syntax and semantics if the presentation service provides a mapping between them. If a mapping is available, presentation protocol data units are encapsulated into session protocol data units and passed down the protocol stack. The Presentation layer 17 can provide independence from data representation by translating between application and network formats. The Presentation layer 17 can transform data into the form that the application accepts. The Presentation layer 17 can format data to be sent across a network, and it is sometimes called the syntax layer.

Layer 7, or the Application layer 18, can be the OSI layer that can be closest to the end user, which means both the OSI Application layer 18 and the user interact directly with the software application. This layer can interacts with software applications that implement a communicating component. Such application programs fall outside the scope of the OSI model. Application layer 18 functions can typically include identifying communication partners, determining resource availability, and synchronizing communication.

When identifying communication partners, the Application layer 18 can determine the identity and availability of communication partners for an application with data to transmit. The most important distinction in the application layer is the distinction between the application-entity and the application. For example, a reservation website might have two application-entities: one using HTTP to communicate with its users, and one for a remote database protocol to record reservations. Neither of these protocols have anything to do with reservations. That logic is in the application itself. The application layer per se has no means to determine the availability of resources in the network. As shown in FIG. 1, Session layer 16, Presentation layer 17 and Application layer 18 can all have a data PDU.

Referring now to FIG. 2, a network intrusion system of the present invention according to several embodiments can be shown, and can be designated using reference character 20. As shown, system 20 can be used to monitor network activity between access points 22a, 22b on a network 24. In FIG. 2, access points 22 can be internet protocol (IP) addresses, and network 24 can be the internet. However, other access points and networks are certainly envisioned, such as intranets, telecommunications networks, and other types of networks.

As shown in FIG. 2, system 20 can also include a reformatting module 26. Reformatting module 26 can receive data from access points 22 that can be in the OSI Transport layer 15 or below format (as used herein, "Transport layer 15 or below formats" can mean one of the Transport layer 15, Network layer 14, Data link layer 13 or Physical layer 12 formats). Reformatting module can reformat such data into a conversation dataset of high order conversations. The conversation dataset can be in OSL Session layer 16 or above format (as used herein, Session layer or above can be taken to mean Session layer 16, Presentation layer 17 or Application layer 18)

Since the intent of the present invention can be to observe patterns of activity at the session (OSI 5) or presentation (OSI 6) layers and flag unusual or abnormal transactional patterns, it is necessary to process the packets, reconstituting the Session level 16 or above data from Transport layer 15 or below data (TCP/IP packets) as a conversations dataset. Using this capability, it can be possible to view network interactions much closer to the level of user interaction.

Referring again to FIG. 2, reformatting module 26 can be connected to training module 28 and to normalization module 30. Reformatting module 26 can transmit the conversation dataset to training module 28 and to normalization module 30. Training 28 module can also be in data communication with normalization module 30. Normalization module 30 can be in data communication with machine learning module 32. For several embodiments, machine learning module 32 can receive a normalized conversation dataset form reformatting module 26 (via normalization module 30) and a normalized portion of the conversation dataset from training module 28 (via normalization module 30). Machine learning module can be trained using the input from training module 28 to classify the conversation dataset from reformatting module 26 as normal or abnormal. The manner in which the process occurs can be described more fully below.

As shown in FIG. 1, several embodiments of the present invention can further include a rules-based module 34 (such as a firewall, for example), which can be connected one or both of access point 22a, 22b. Rules-based module 34 can receive network traffic between access point(s) 22 that can be at the Transport layer 15 or below, and can monitor the network activities by inspecting the content(s) of the data packets for anomalies, using rules-based criteria.

Figure 3:
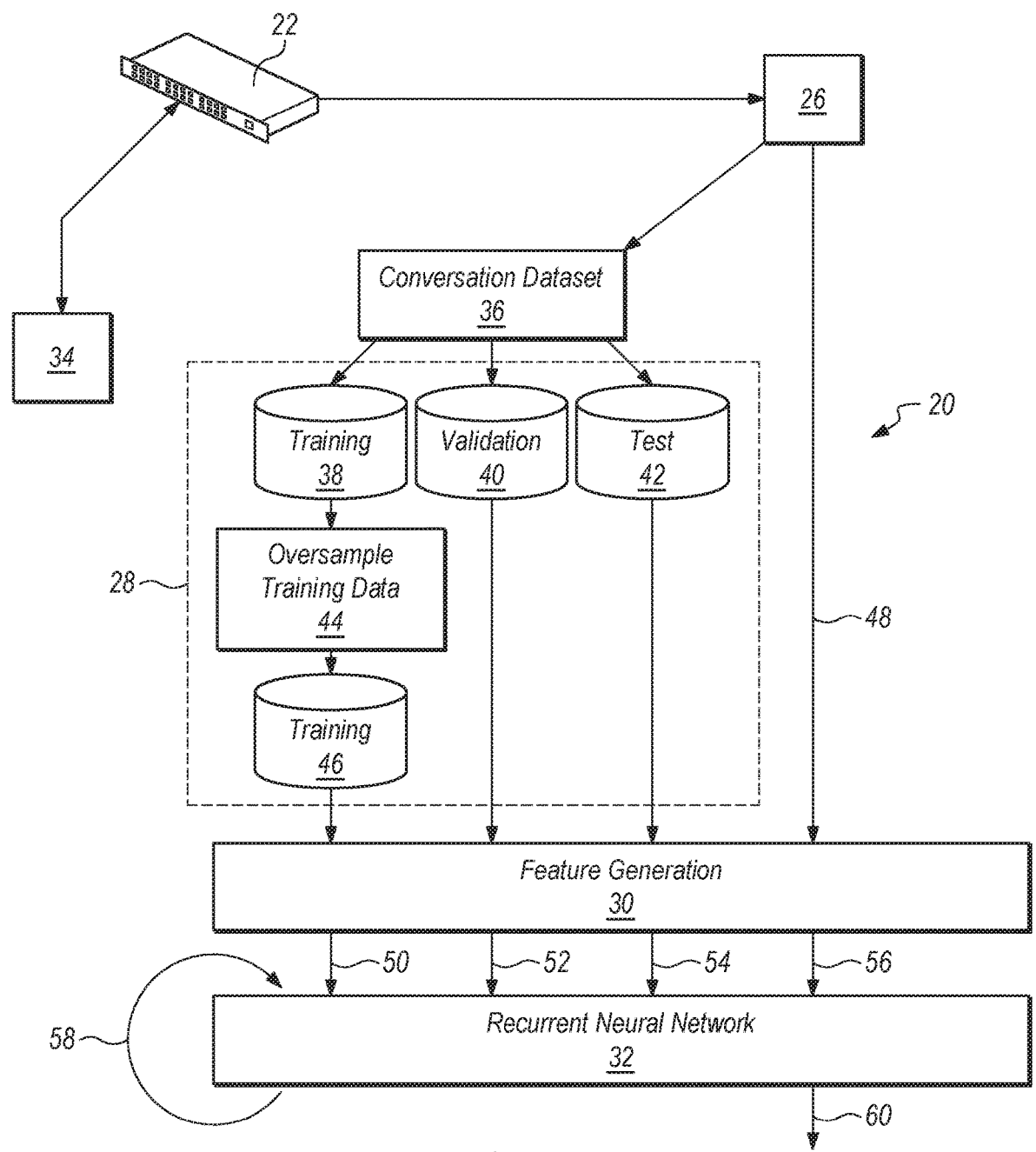
FIG. 3 is a block diagram of the system of FIG. 2, which can show the training module of FIG. 2 in greater detail.

Referring now to FIG. 3, the process flow for the system 20 and associated methods can be described in greater detail.

As shown in FIG. 3, data packets in raw packet capture (PCAP) format can be received at reformatting module 26 from access point 22, and can be processed into an internal, which can result in a conversation dataset 36 of high order conversations, which can be formatted at an OSI session layer 16 or above format.

As used herein, conversations can be defined as the interaction between pairs of network access points 22 as identified by their internet protocol (IP) addresses. If no packets are detected between the access points for a specified period of time, the conversation can be considered terminated. As a result of the step at reformatting module 26, for packets assigned to a conversation, interactions between pairs of ports are consolidated, and network service level protocol (e.g. HTTP, SSL) interactions are resolved. This can address a relatively common situation where a web page, for example, is fetched followed by multiple requests for items found on the page such as images and JavaScript libraries.

The result of this process can be a stream of conversations in conversation dataset 36. Each conversation can consist of an ordered (by time) set of interactions between ports. Each interaction is further comprised of an ordered (by time) set of transmissions between end points (e.g. HTTP get followed by html data returned).

If the machine learning module 32 is being trained, conversation dataset 36 can be sent to training module 28, as shown in FIG. 3. At training module 28, conversation dataset 36 can be split or divided into a training data subset 38 (roughly 80% of conversation dataset 36), a validation data subset 40 (roughly 10% of conversation dataset 36) and a test data subset 42 (approximately 10% of conversation dataset 36). For the systems and methods according to several embodiments, training data subset 38 can be balanced by oversampling component 44. For some embodiments, the oversampling technique of Chawla, et al. can be used to balance the training data subset. Other oversampling techniques could be used. In choosing an oversampling technique the small size of the abnormal dataset can be a key factor. The systems and methods of the present invention can consider a number of the fields (e.g. payload length, time between packets), and can adjust the values based on Gaussian distributions with means set to the current value of the fields and variances based on the real variance in the fields. Oversampling can result in a balanced training data subset 46, as shown in FIG. 3.

Referring again to FIG. 3, balanced training data subset, validation data subset 40 and test data subset 42 can be sent to normalization module 30 from training module 28. Conversation dataset 36 can also be sent directly to normalization module 30 from reformatting module, as depicted by arrow 48 in FIG. 3. At normalization module 30, it should be appreciated that inputs to the machine learning module 32 can consist of a set of features corresponding to the data fields extracted from conversation dataset 36. These features can include protocol specific features such as command and message codes. Generally, there are two types of fields involved: 1) Continuous values such as payload length and time values wherein the magnitude of the value has significance; and, 2) Fields with discrete sets of values in which the magnitude of the value is not significant. Port numbers and HTTP command codes can be examples of this latter type of feature.

To normalize the feature space at normalization module 30, all features can be presented to the machine learning module 32 as values in the range of 0 to 1. A variety of alternative methods for feature normalization can be used. For continuous values, values were linearly normalized to [0, 1]. Time intervals between packets can be represented as percentages of the total transaction time. Total transaction time itself was not included as a feature, but future embodiments may envision inclusion of total transaction time. Discrete values were represented as a set of individual binary features, one feature for each possible value of the field. For example, if 5 different port numbers were encountered, there would be 5 separate binary fields all set to 0 with the exception of the feature corresponding to the current value of the field which can be set to 1.

As shown in FIG. 3, normalization of inputs by normalization module 30 can result in a normalized and balanced training data subset (arrow 50) a normalized validation data subset (arrow 52), a normalized test data subset (arrow 54) and a normalized conversation dataset (arrow 56), which can be inputs into machine learning module 32. Machine learning module 32 can be trained using normalized and balanced training data subset. The trained machine learning module 32 can be validated using normalized validation data subset, which can result in an estimated training accuracy for system 20, and the training and validation can be repeated (arrow 58) until the estimated training accuracy reaches a desired level, or until the estimated validation accuracy does not improve with successive epochs (an epoch can be thought of a cycle of training dataset passing through the training process as described above. Normalized test data subset 42 can then be used by machine learning module 32 to result in an independent predictor for the operational accuracy for system 20. The validation dataset 26 can be used to The normalized test data accuracy can further inform a decision on the usability of the trained machine learning module 32.

If machine learning module 32 has already been "trained", conversation dataset 36 can be sent to normalization module 30 for expansion into a vector format that can be understood by the machine learning module 32 (normalization). The normalized conversation dataset (depicted by arrow 56 in FIG. 3, can then be classified by the trained machine learning module 32, as depicted by output arrow 60 in FIG. 3.

Figure 4:
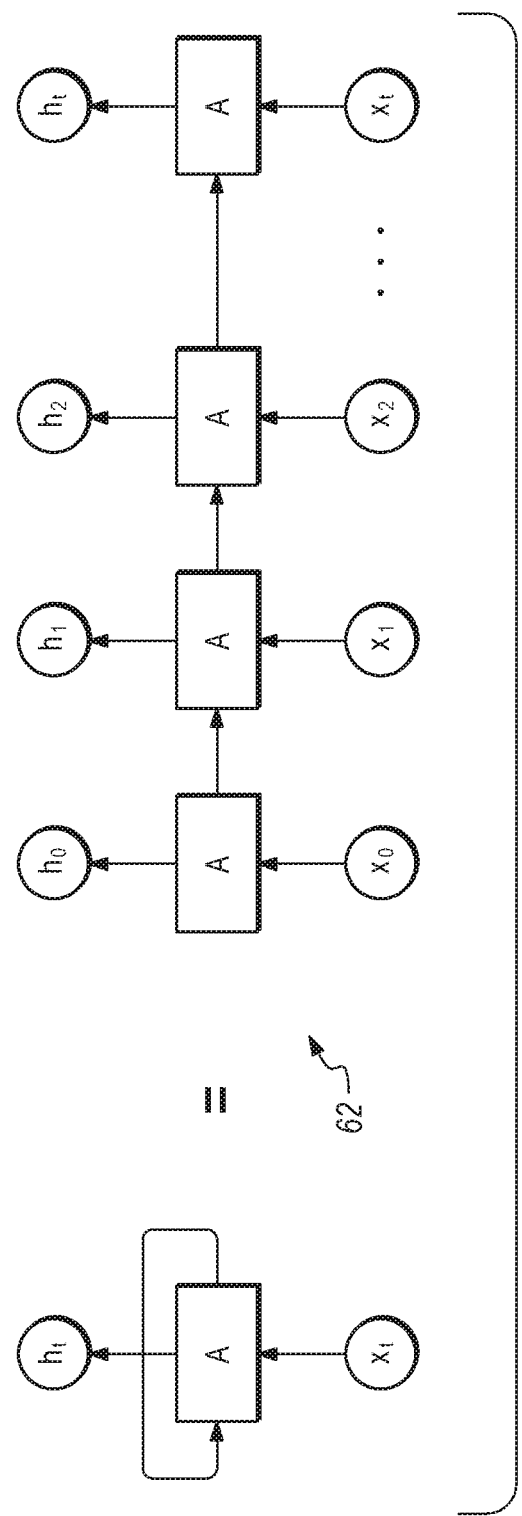
FIG. 4 can be a general diagram of a recurrent neural network for the machine learning module of FIG. 3.

Because the systems and methods according to several embodiments can use the time relationships between the data packet sequences, machine learning modules that are time-based can be used for the machine learning module 32. One machine learning module that could be used can be a neural network. In the prior art, neural networks have been shown most effective when the output classes are well balanced. A recurrent neural network (RNN) can be a class of artificial neural network where connections between nodes can form a directed graph along a sequence. This allows it to exhibit temporal dynamic behavior for a time sequence. An example of an RNN 62 can be seen in FIG. 4 wherein X represents the output of normalization module 30, h the contents of the hidden layers between LSTM layers 64$a$ and 64$i$, and A represents the Long Short-Term Memory (LSTM) cells.

Unlike feed forward neural networks, RNNs 62 can use their internal state (memory) to process sequences of inputs. This can be referred to as the imbalanced data problem wherein the number of instances of one class (e.g. the "good transactions") significantly outweighs the number of instances of the other class (the "bad" transactions). This is particularly problematic in network intrusion detection since, in a typical network, the percentage of abnormal transactions is very low. The imbalanced data problem can be addressed through oversampling of training data subset, as described above.

Figure 5:
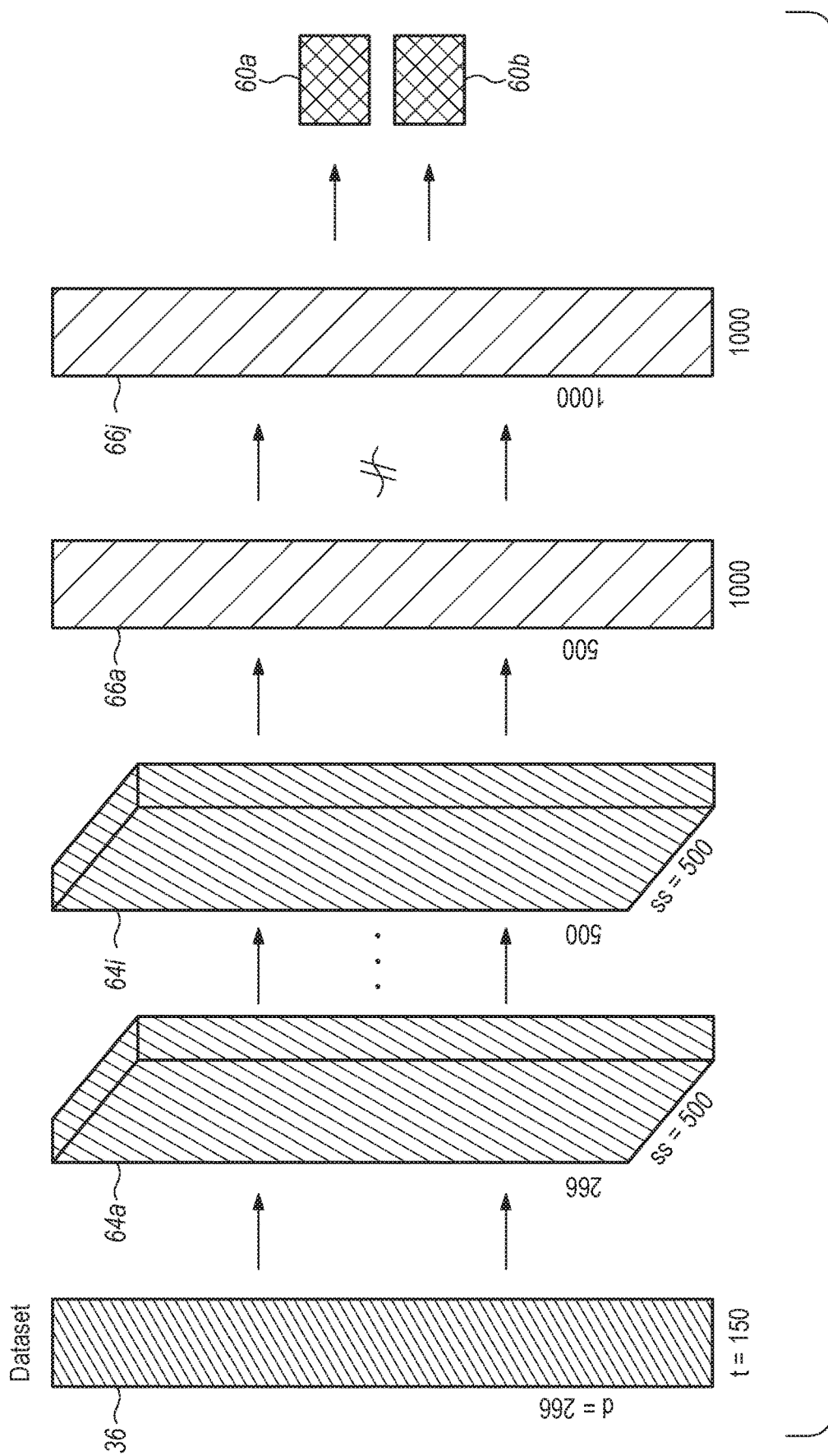
FIG. 5 can be a block diagram, which can show the components of the recurrent neural network of FIG. 6 in greater detail.

For the present invention according to several embodiments, and referring now to FIG. 5, RNN 62 can consist of at least one or two layers 64a through 64i of long short-term memory (LSTM) cells, 64a through 64i, with each LSTM cell 64 having a width of between 500 and 5000 cells. RNN 62 can have additional layers(s) of at least one layer 66a, and up to five or more layers 66j of cell layers 66. Cell layers 66 can have fully-connected, rectified linear units with widths varying from 500 to 1000 cells. Referring briefly to FIGS. 3 and 5, output 60 can be taken from the last cell layer 66j of RNN 62, with the output 60 of the last layer 66 being of width 2 to correspond to the two possible outcomes (normal output 60a and abnormal output 60b).

Figure 6:
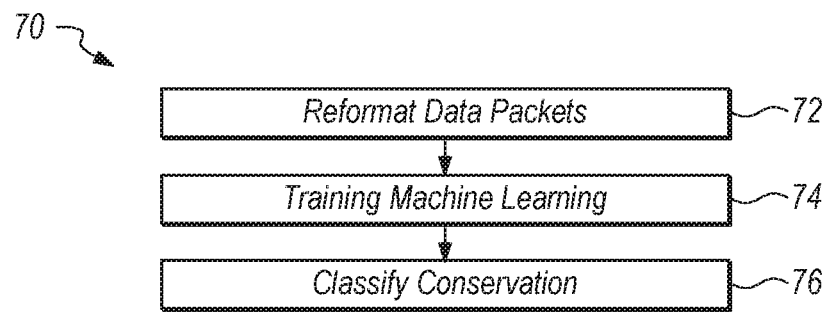
FIG. 6 can be a block diagram, which can represent steps that can be taken to accomplish the methods of the present invention according to several embodiments; and, FIG. 7 can be a block diagram, which can represent the training step of FIG. 6 in greater detail for several embodiments.

Referring now to FIG. 6, a block diagram 70 can be shown, which can be representative of steps that can be taken for the methods of the present invention according to several embodiments. As shown, the methods can include the step 72 of reformatting network activity data between two network access point from an OSI Transport layer or below format to an OSI Session layer or above format. The accomplishment of step 72 can result in the conversation dataset as described above. As shown in FIG. 6, the methods can further include the step 74 of training the machine learning the module using the conversation dataset. The methods can also include the step 76 of classifying high order conversations from the conversation dataset 36 as normal or abnormal, using the machine learning module, which has been trained in step 74. Steps 74 and 76 can concurrently with distinct conversation datasets, or they can occur in sequence using the same conversation dataset 36. Method 70 can optionally include the step of classifying the network activity as normal or abnormal by inspecting data packet content using a rules-based module, provided the data packets have a Transport layer or below format, and have not yet been reconstituted into OSI Session layer or above.

Figure 7:
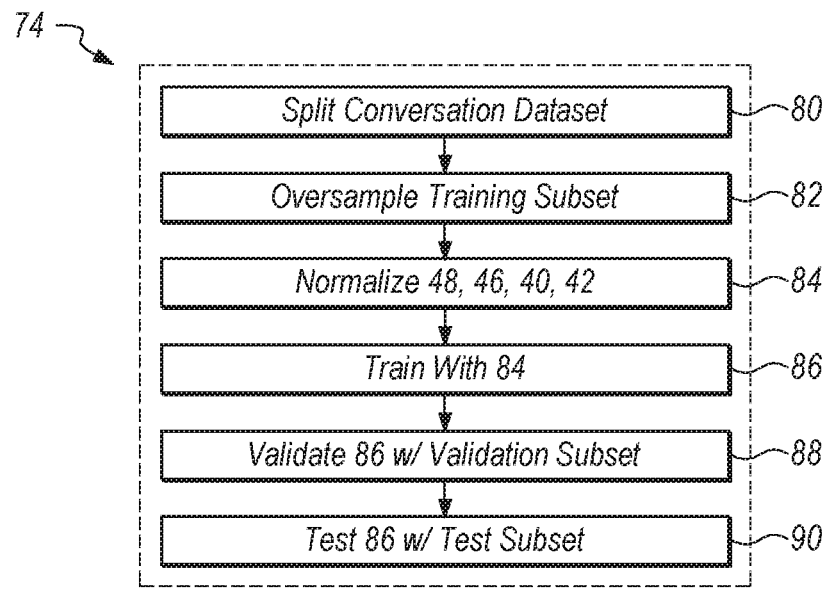

Training step 74 can be broken down into greater detail. As shown in FIG. 7, training step can include the step 80 of splitting conversation data set 36 into a training data subset 38, a validation data subset 40 and a test data subset 42. Training data subset 82 can be oversampled, as shown by block 82, which can result in a balanced training data subset 48. Balanced training data subset 48, validation data subset 40 and test data subset 42 can be normalized at normalization module 30, as indicated by step 84. As indicated by block 86, machine learning module 32 can be trained with the balanced and normalized training data subset resulting from step 84. In step 88, the trained machine learning module 32 can be validated using the normalized validation data subset resulting from step 84, which can result in an estimated training accuracy in classification for the machine learning module 32. IN step 90, the training machine learning module 32 can be tested using normalized test data subset resulting from step 84, to yield an operational training accuracy for the machine learning module. These steps can be accomplished using the structure and cooperation of structure described above.

The use of the terms "a" and "an" and "the" and similar references in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for defining anomalous network behaviors between network access points on an Open System Interconnection (OSI) network, said method comprising the steps of:

A) reformatting data packets, which are each transmitted between a pair of a plurality of pairs of said network access points, from an OSI Transport layer or below format into an OSI internal session layer or above format, to yield a conversation dataset of high order conversations, wherein the conversation dataset includes a respective one of the high order conversations for each of the pairs between which the data packets are transmitted, and each one of the data packets is assigned to the respective one of the high order conversations for the pair between which the one of the data packets is transmitted;

B) training a machine learning module using said conversation dataset, wherein said machine learning module is a recurrent neural network, and wherein said step B) further comprises the steps of:

B1) splitting said conversation dataset into a training data subset, a validation data subset and a test data subset;

B2) oversampling said training data subset from said step B1), to yield a balanced training data subset;

B3) normalizing said balanced training data subset, said validation data subset and said test data subset into a format suitable for input into said recurrent neural network;

B4) training said recurrent neural network with said normalized, balanced training data subset from said step B3), to yield a trained said recurrent neural network;

B5) validating said trained recurrent neural network with said normalized validation data subset from said step B3), to yield an estimated training accuracy for said recurrent neural network; and B6) upon completion of said step B4), testing said trained recurrent neural network with said normalized, balanced test data subset from said step B3), to yield an estimated operational accuracy for said recurrent neural network; and C) classifying said high order conversations as either normal network activity or abnormal network activity using said trained machine learning module.

2. The method of claim 1, wherein said step B2) is accomplished using a Chawla oversampling technique.

3. The method of claim 1, wherein said step B3) is accomplished so that all values are between 0 and 1 in the format suitable for input into said recurrent neural network.

4. The method of claim 3, wherein the training of said step B4) is in response to a plurality of time interval values between the data packets in said normalized, balanced training data subset and the time interval values are represented as percentages of total transaction time for said normalized, balanced training dataset.

5. The method of claim 1, wherein said steps B) and C) are accomplished using the recurrent neural network having at least one layer of long short-term memory (LSTM) cells and at least one layer of cells that use rectified linear units.

6. A method for improved network intrusion monitoring of network activity between network access points on an Open System Interconnection (OSI) network, said network activity including a plurality of data packets, said plurality of data packets each having data content, said method comprising the steps of:

A) inspecting said plurality of data packets at an OSI transport layer using a predetermined rules-based criteria that accesses and analyzes the data content of said data packets;

B) reformatting said data packets, which are each transmitted between a pair of a plurality of pairs of the network access points, from said OSI transport layer or below format to an internal OSI session layer or above format, to yield a conversation dataset of high order conversations, wherein the conversation dataset includes a respective one of the high order conversations for each of the pairs between which said data packets are transmitted, and each one of said data packets is assigned to the respective one of the high order conversations for the pair between which the one of said data packets is transmitted;

C) training a machine learning module using said conversation dataset, wherein said machine learning module is a recurrent neural network, and wherein said step C) further comprises the steps of:

C1) splitting said conversation dataset into a training data subset, a validation data subset and a test data subset;

C2) oversampling said training data subset from said step C1), to yield a balanced training data subset;

C3) normalizing said balanced training data subset, said validation data subset and said test data subset into a format suitable for input into said recurrent neural network;

C4) training said recurrent neural network with said normalized, balanced training data subset from said step C3), to yield a trained said recurrent neural network;

C5) validating said trained recurrent neural network with said normalized validation data subset from said step C3), to yield an estimated training accuracy for said recurrent neural network; and C6) upon completion of said step C4), testing said trained recurrent neural network with said normalized test data subset from said step C4), to yield an estimated operational accuracy for said recurrent neural network;

D) classifying said data traffic as abnormal when said least one of said plurality of data packets meets said predetermined rules-based criteria from said step A); and E) classifying said high order conversations as either normal network activity or abnormal network activity using said trained machine learning module.

7. The method of claim 6, wherein said step C2) is accomplished using the Chawla oversampling technique.

8. The method of claim 6, wherein said step C3) is accomplished so that all values are between 0 and 1 in the format suitable for input into said recurrent neural network.

9. The method of claim 8, wherein the training of said step C4) is in response to a plurality of time interval values between the data packets in said normalized, balanced training data subset and the time interval values are represented as percentages of total transaction time for said normalized, balanced training dataset.

10. The method of claim 6, wherein said steps C) and E) are accomplished using the recurrent neural network having at least one layer of long short-term memory (LSTM) cells and at least one layer of cells that use rectified linear units.

11. The method of claim 1, wherein the respective one of the high order conversations for each one of the pairs includes a time sequence of the data packets transferred between the one of the pairs of said network access points, and the training of said step B) is in response to a plurality of time interval values between the data packets in the time sequence for each of the pairs.

12. The method of claim 11, wherein the training of said step B) neither accesses nor analyzes a data content of the data packets.

13. The method of claim 6, wherein the respective one of the high order conversations for each one of the pairs includes a time sequence of said data packets transferred between the one of the pairs of said network access points, and the training of said step C) is in response to a plurality of time interval values between said data packets in the time sequence for each of the pairs.

14. The method of claim 13, wherein the training of said step C) neither accesses nor analyzes the data content of said data packets.

* * * * *